(No Model.) 3 Sheets—Sheet 1.
J. A. GRIFFITHS.
VELOCIPEDE.
No. 338,151. Patented Mar. 16, 1886.
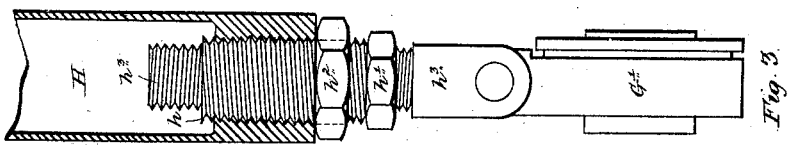
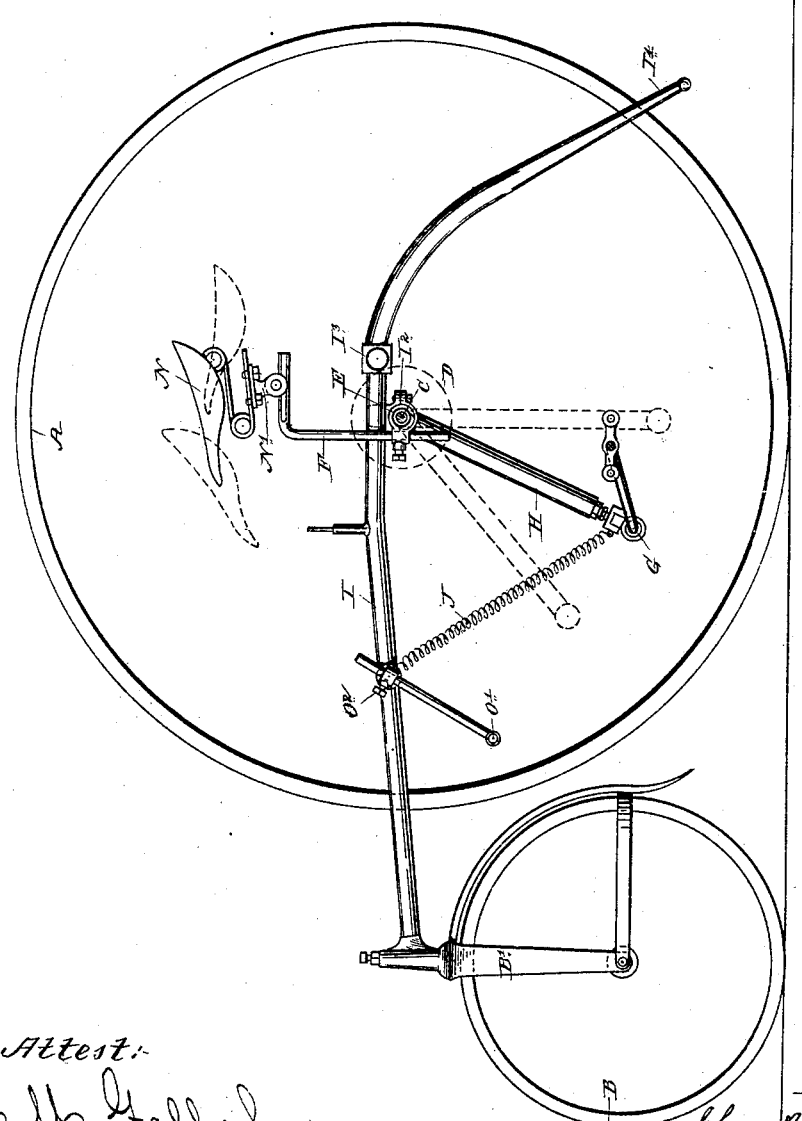
Attest:
G. M. Gallaher
J. M. Knobloch
Inventor
John A. Griffiths
per Henry Orth
his atty

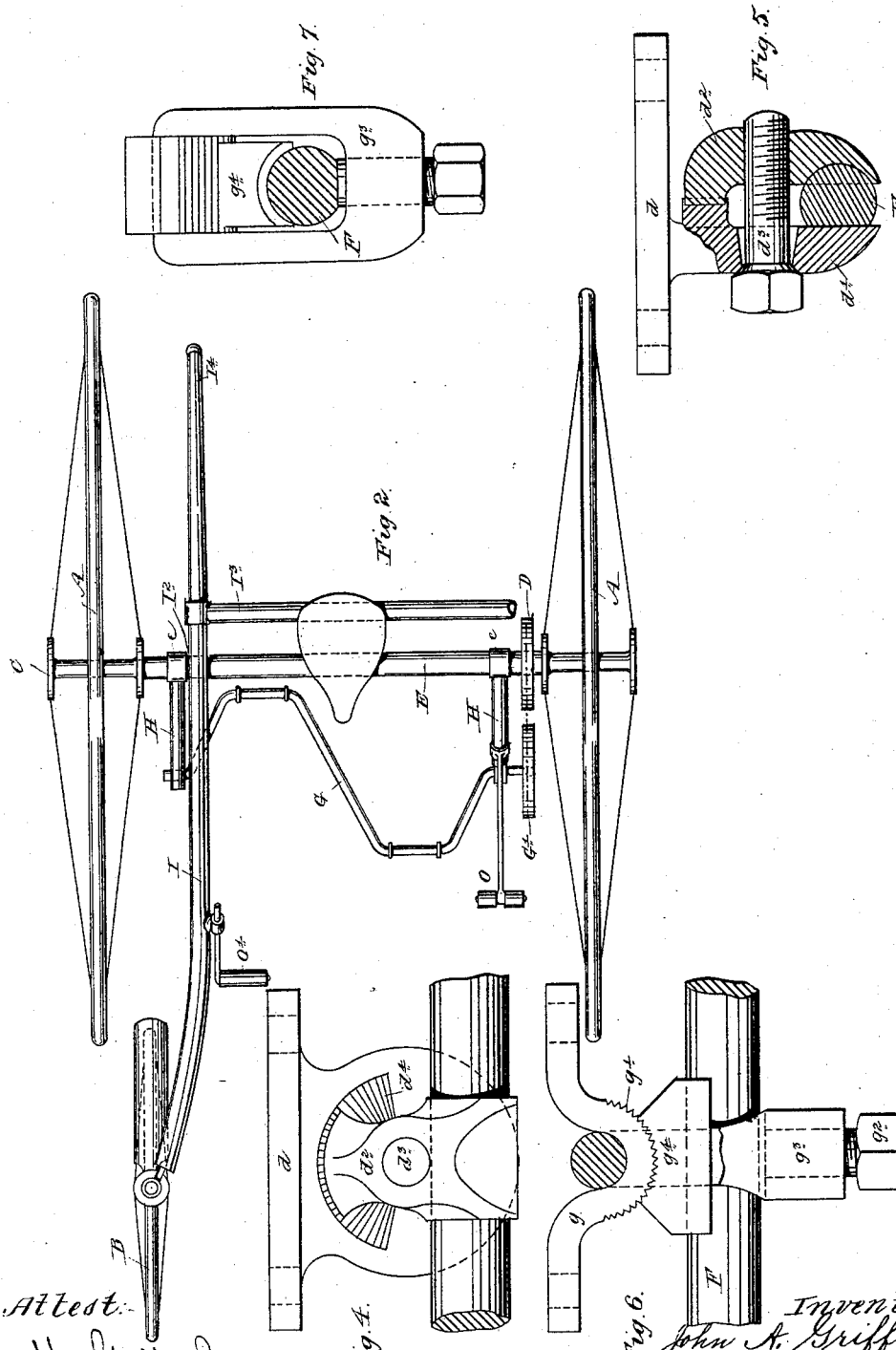

(No Model.)
J. A. GRIFFITHS.
VELOCIPEDE.
No. 338,151.
3 Sheets—Sheet 3.
Patented Mar. 16, 1886.
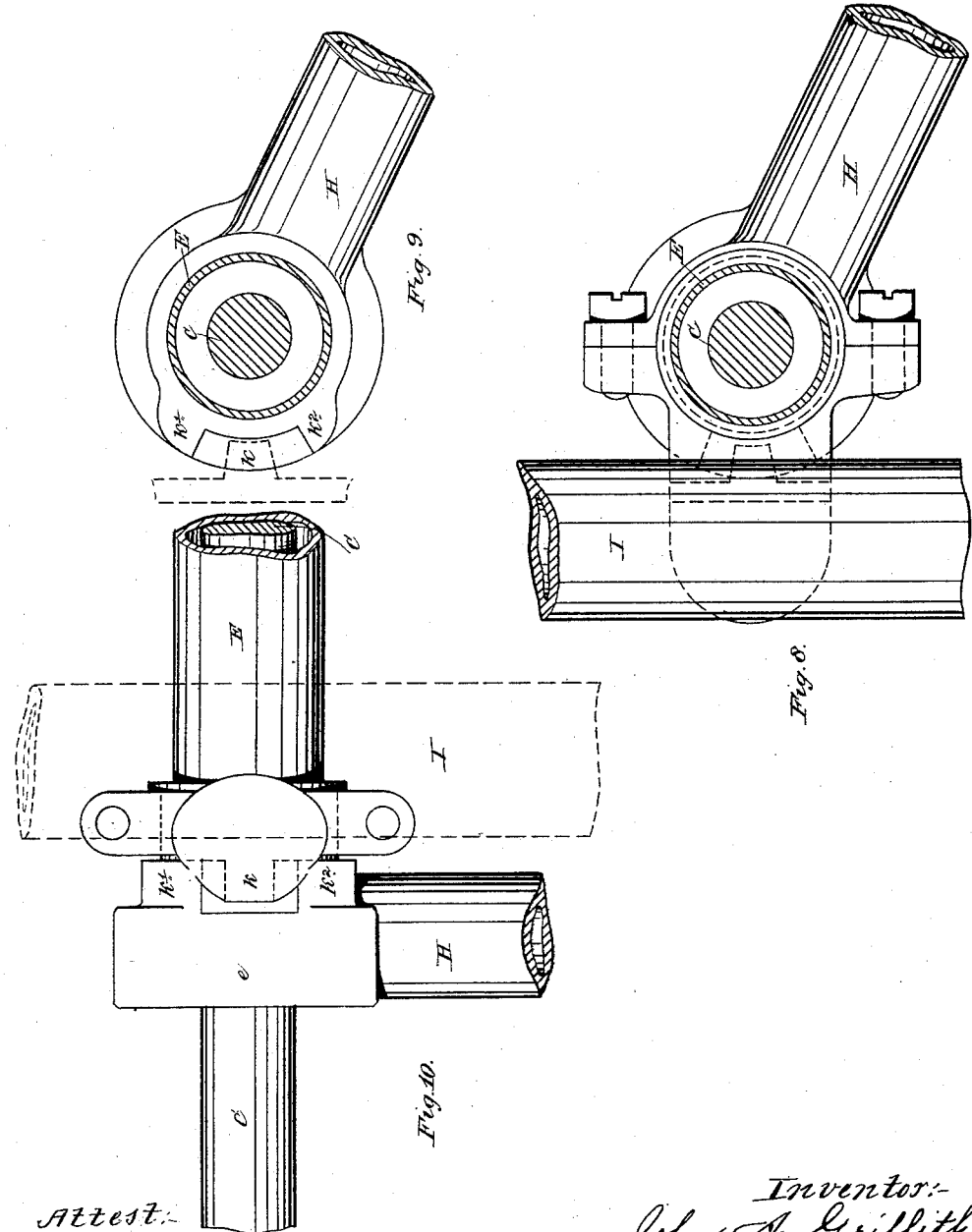

UNITED STATES PATENT OFFICE.

JOHN ALFRED GRIFFITHS, OF COVENTRY, ENGLAND.

VELOCIPEDE.

SPECIFICATION forming part of Letters Patent No. 338,151, dated March 16, 1886.

Application filed September 21, 1885. Serial No. 177,739. (No model.) Patented in England July 20, 1883, No. 3,564.

*To all whom it may concern:*

Be it known that I, JOHN ALFRED GRIFFITHS, a subject of the Queen of England, residing at Coventry, England, have invented new and useful Improvements in or Applicable to Tricycles and other Velocipedes, and in part to other purposes, of which the following is a specification, a part of which invention—namely, that part relating to the adjustment or positioning of the bearings for the cranks or treadle-shafts, as hereinafter described—has been patented in Great Britain under date of July 20, 1883, No. 3,564.

These improvements are specially designed to remove or ameliorate certain difficulties in the action of velocipedes, and more particularly of tricycles when traveling over rough roads or against considerable resistances of gradient wind or surface.

In the accompanying drawings, Figure 1 is a side elevation of a tricycle constructed according to this invention. Fig. 2 is a plan, and Figs. 3 to 10 are details of various parts.

The chief feature of the invention is that the frame which carries the crank or pedal shaft is hung upon the rest of the frame-work in such a manner that the rider can at pleasure bring his seat farther forward or backward within certain limits, the pedal-shaft moving at the same time in the opposite direction, so that the relative positions of saddle and pedals remain unchanged, while the center of gravity of the rider is thrown forward or backward, as the exigencies of the situation may demand.

There are two large driving-wheels, A A, and one smaller steering-wheel, B, placed, preferably, in front, (except when the velocipede is to carry more than one rider, in which case it may in some designs be preferably placed in the rear.) The driving-wheels A are carried on an axle, C, which is provided with a chain-wheel and balance-gear, D, of any usual type, which may be placed either centrally or at one side, as in the illustration. Around this axle is an axle-tube, E, running upon ball or plain bearings $e\ e$ on the axle-bar, so that it cannot shift laterally. To the center of the axle-tube is attached the L-pin F, to which the saddle is fixed. Below the axle-tube the crank-shaft G is carried by two leg-tubes, H, one at each end, and the two axles are connected by a pitch-chain or special driving-band passing over the two chain-wheels D and G'. The lower ends of the legs are provided with hollow right and left hand screws, for the easy and convenient adjustment of the pitch-chain. This adjusting arrangement (shown in Fig. 3) is constructed as follows: The hollow "leg" H is tapped with a right-hand thread, and into this screws a hollow sleeve or bush, $h$, having a male right-hand thread on the outside and a female left-handed thread on the inside. At the lower or outer end the bush $h$ has a suitable head, $h'$, for convenience in turning it round, and a lock-nut, $h^2$, for securing it in its place when adjusted. Into the bush $h$ fits a suitably-threaded slot-joint, $h^3$, which carries the crank-bearing G'. It will be seen that by slacking the lock-nut $h^2$ and turning the bush $h$ the length of the leg H can be increased or diminished without requiring any of the parts to be removed or the slot-joint $h^3$ to be turned round, both being easily worked by an ordinary wrench and spanner.

The steering-wheel B is mounted in a fork and Stanley head, B', at the forward end of the backbone I, which may be placed centrally or at one side, as shown in Fig. 2, or may be provided with suitable detachable joints for use in either position. This backbone is connected to the axle-tube or its equivalent by a strap or other joint, preferably concentric and coaxial with the axle and tube; but the machine may be made with the axis of the joint parallel to the axle and separated from it—as, for instance, on an independent arm; but the greater the distance of separation the greater are the difficulties of afterward balancing the machine and in arranging the brake apparatus.

The joint $I^2$, Fig. 1, may be at one end of the axle-tube only and provided with steel cones or balls, to prevent shaking, or may be doubled, and the two joints may be connected by a cross-tube, $I^3$, fixed to the backbone, as shown in Figs. 1 and 2.

Upon the backbone I, and close to the axle-tube E, is fixed a stop, K, which engages with either of the stops K' or $K^2$ of the swing-frame, so that it can only move a certain distance, as will be easily understood, and is clearly shown in Figs. 8, 9, and 10. The backbone is prolonged backward at I⁴, as shown, to further limit the swing when the back-stop lifts the steering-wheel off the ground.

To give the swing-frame a tendency to maintain the backward position of riding, one or more springs, J, Fig. 1, are attached to the backbone and swing-frame. In the drawings a single spring is shown extending from one leg-tube to the backbone forward. An alternative device consists of a torsional spring encircling the axle-tube and pressing against the backbone, or plate-springs may be attached between the frames. The great advantage which these springs afford is that an entirely inexperienced rider can at once command the free balance and ride the velocipede with safety.

The swing-frame may of course be made for central driving, instead of the side driving above described. In such case the two side leg-tubes, H, would be replaced by a single central tube, which would carry the driving-axle and chain-wheel and ordinary bicycle-cranks on each side of the tube, as will be well understood by persons skilled in the art.

The usual handles are attached to the steering-frame, where required, or one to the backbone and one to the swing-frame. These may be fixed or adjustable, and any convenient means of connecting the steering-handle with the steering-wheel may be adopted.

The brake is an ordinary band round the train-arm of the balance-gear D, so as to act equally on both large wheels A. The lever which tightens the band is preferably attached to part of the backbone I or rigid frame I³, but may be in certain cases attached to the swing-frame.

This velocipede requires greater range of adjustability than usual of the saddle N, to suit different riders, and therefore, in addition to the usual L-pin, F, and sliding clamp N′, the clamp is made in sections, as shown in Figs. 4 and 5, so that the peak of the saddle may be raised or depressed at will. To accomplish this the clamp N′ is made in two or more pieces, one part being on each side of the horizontal branch of the L-pin. The main part $d$ carries the spring or saddle above it, and has its lower arm, $d'$, resting against the L-pin F. The second part, $d^2$, is not attached to the seat, but is clamped to the main part $d'$ by a screw-bolt, $d^3$, close above the L-pin F, which lies between the jaws of the two pieces $d'$ $d^2$. The first part, $d'$, rests against a flat on that side of the L-pin and prevents rotation round the pin F, yet it is permitted to rotate forward and backward. The second part, $d^2$, has its lower jaw fitted to the L-pin, so that it may slide along it, but not rotate forward and backward. The upper jaws of both pieces are fitted with shallow radial teeth or grooves $d^4$, or are otherwise roughened. Thus a slight slackening of the clamp-screw $d^3$ permits the clamp to be set forward or backward on the L-pin F, while a greater slackening releases the radial teeth and permits the forward and backward inclination of the saddle to be varied by the amount of one or more teeth to suit the rider. Sometimes the clamp may be made with the front jaw divided and an extra set of teeth provided.

An alternative construction is shown in Figs. 6 and 7, where the teeth $g'$ are arranged on a segmental clamp, $g$, which carries the saddle-spring, and the locking is done by a screw, $g^2$, in the shackle $g^3$, encircling the clamp $g$, and locking plate $g^4$ and the L-pin F.

To enable the feet to be removed from the pedals when going down an incline, foot-rests are provided. (See Figs. 1, 3.) In the illustration Fig. 2, a left foot-rest, O, is attached to the left leg-tube H, and is at the same distance from the seat, however the frame may swing. On the right hand the foot-rest O′ is attached to the backbone I, and has an adjustment in an inclined direction nearly along a line passing through the seat and the mean position of the foot-rest. This is effected by a sleeve and clamping-screw, O², as shown in Figs. 1 and 2.

I claim—

1. In a velocipede, the combination, with a rigid frame carrying the drive and steering wheels, of a frame carrying the rider's seat and the pedal-shafts loosely connected with and oscillating freely on said rigid frame, substantially as and for the purpose specified.

2. In a velocipede, the combination, with a swing-frame such as described, of one or more springs connecting said swing-frame with the rigid frame, for the purpose of controlling its movements, substantially in the manner and for the purpose specified.

3. In a velocipede, the combination, with a rigid frame carrying the drive and steering wheels, and a frame carrying the rider's seat, and pedal-shafts loosely connected with and oscillating freely on said rigid frame, of a stop to limit the oscillations of the movable frame on or around the rigid frame in either direction, substantially as and for the purpose specified.

4. The combination, in a velocipede, of a spring-controlled swinging frame.

5. As a means for adjusting the position of the crank or pedal axle, the combination, with the leg-tube H and the support or bearing for the crank or pedal axle, of an intermediate sleeve screw-threaded exteriorly and interiorly in reverse directions, and operating to adjustably connect the said leg-tube and bearing, substantially as and for the purpose specified.

6. As a means for adjusting the position of the crank or pedal axle, the combination, with the leg-tube H, screw-threaded interiorly, and a sleeve, $h$, screw-threaded exteriorly and interiorly in reverse directions, and adapted to be screwed into said leg-tube, of a slot joint or bearing, $h^3$, provided with a screw-threaded shank constructed to fit the internal screw-thread of the sleeve $h$, and a suitable check-nut, substantially as and for the purpose specified.

7. In a velocipede, the combination, with a swinging frame having stops K' K², of a fixed frame having a stop, K³, constructed to engage the stops K' K² and limit the amplitude of oscillation of said swinging frame, substantially as and for the purpose specified.

8. In a velocipede, the combination, with the spring-supporting bracket $d$, having a face, $d'$, adapted to slide upon the flat side of the support F, of an independent jaw, $d^2$, adapted to fit the round side of the said support F and toothed or roughened, so as to engage with the roughened surface $d^4$ of said bracket, the two portions being clamped together by a screw-bolt, $d^3$, the whole constructed and operating substantially in the manner and for the purpose specified.

9. In a velocipede, the combination, with the angle-standard F, of a seat-support adjustable longitudinally and radially on the horizontal arm of said standard, and a single locking device to lock the said support in position when adjusted, substantially as and for the purpose specified.

10. In a velocipede, the combination, with a rigid frame carrying the drive and steering wheels, and a frame for carrying the cranks or pedal-shafts, loosely connected with and oscillating on said rigid frame, of a seat-standard connected with the oscillating frame and a seat adjustable longitudinally and radially on said seat-standard, substantially as and for the purpose specified.

11. In a velocipede, the following elements in combination: a rigid frame for the drive and steering wheels, a frame for the cranks or pedal-shafts, loosely connected with and oscillating on said rigid frame, a stop to limit the amplitude of the oscillations of said oscillating frame, a seat-standard adjustably connected with the oscillating frame, and a seat adjustable longitudinally and radially on said standard, substantially as and for the purpose specified.

In testimony whereof I have hereto set my hand in the presence of two subscribing witnesses.

JOHN ALFRED GRIFFITHS.

Witnesses:
BERNHARD DUKES,
H. B. BRIDGE.